Aug. 7, 1923.
H. FERGUSON
1,464,130
MEANS FOR COUPLING AGRICULTURAL IMPLEMENTS
Filed Dec. 15, 1920  2 Sheets-Sheet 2
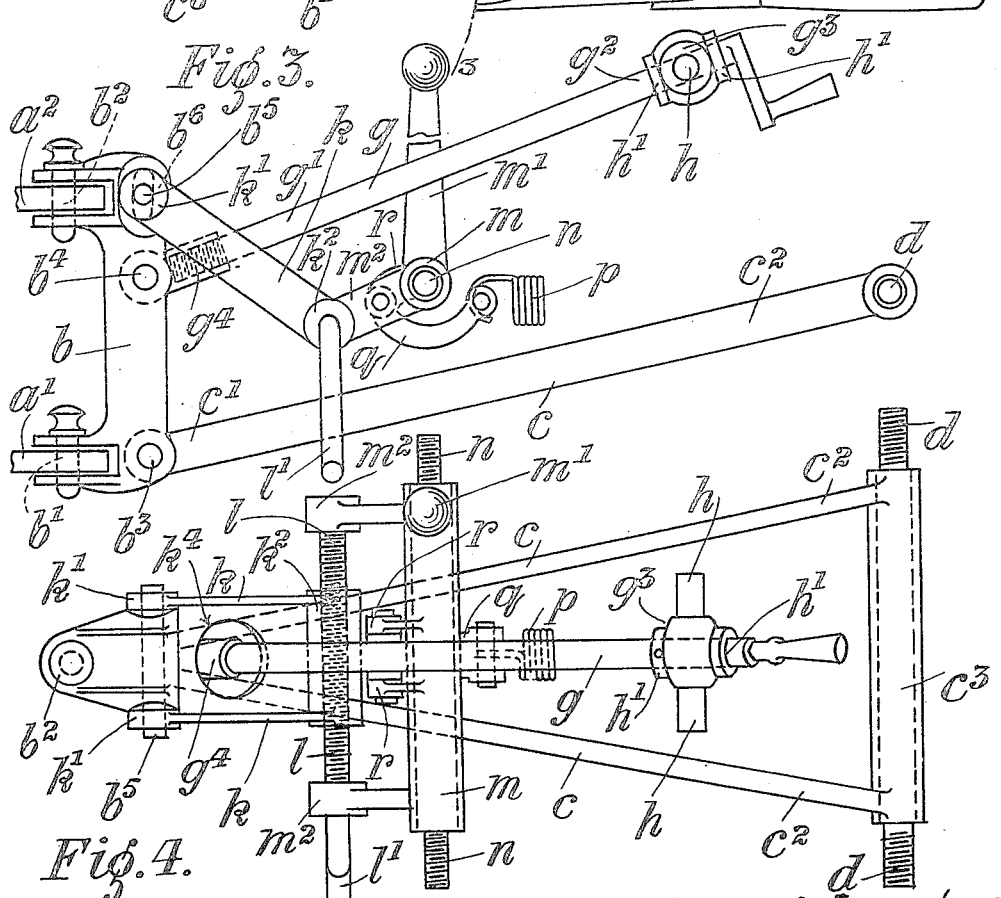

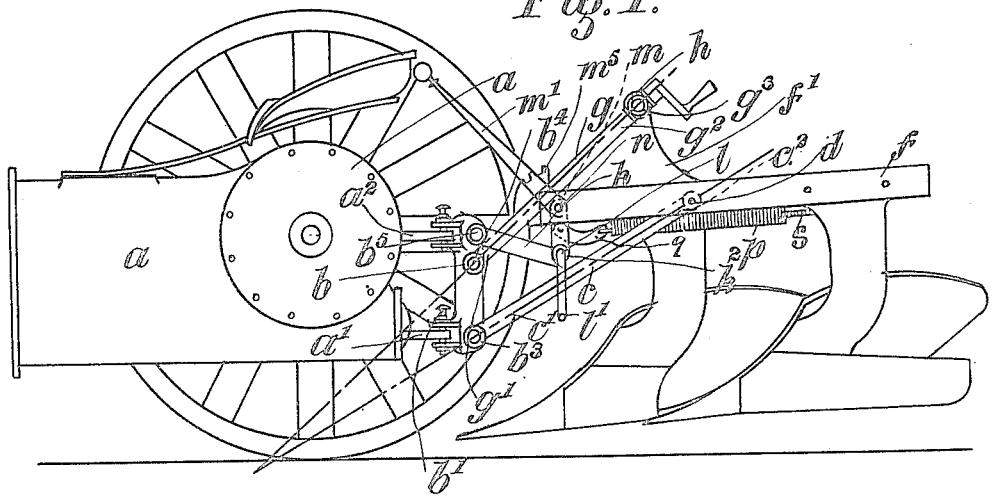
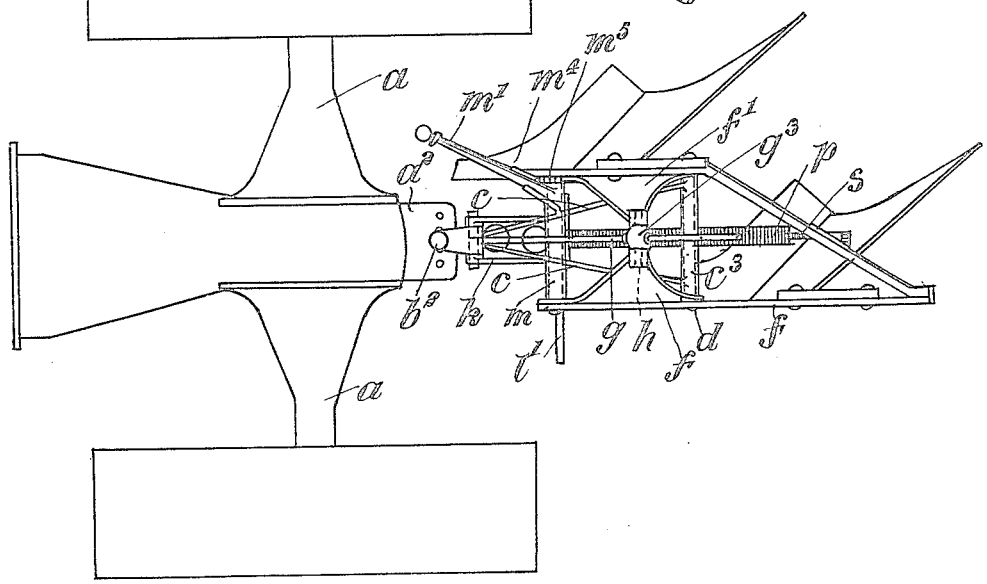

Patented Aug. 7, 1923.

1,464,130

UNITED STATES PATENT OFFICE.

HARRY FERGUSON, OF BELFAST, IRELAND.

MEANS FOR COUPLING AGRICULTURAL IMPLEMENTS.

Application filed December 15, 1920. Serial No. 431,039.

*To all whom it may concern:*

Be it known that I, HARRY FERGUSON, of 83 May Street, Belfast, Ireland, a subject of the King of Great Britain and Ireland, have invented certain new and useful Improvements in or Relating to Means for Coupling Agricultural Implements, of which the following is a specification.

This invention relates to agricultural implements of the class adapted to be operated by tractors, and its object is to provide improved means whereby the implement, say, a plough, can be closely hitched to the tractor and, whilst so hitched, can be kept at the desired depth in the ground during operation.

With the ordinary types of tractor and the usual single hitch connection, it is impossible to closely hitch, say, a two or three furrow plough to the tractor and yet maintain the shares, during ploughing, constantly and uniformly at the adjusted depth in the ground owing to the line of draft being such that the plough shares continually tend to rise up out of the soil and thereby render proper and effective ploughing impossible; moreover, there is always a danger, in the event of great resistance to the shares by an obstruction, of the tractor being turned over backwards. Many advantages result from close hitching and the most favourable position for such hitching would be at a point close to the ground as then the most favourable line of draft would be obtained, but, in practice, it is impossible to do this as sufficient clearance would not then be left between the hitch point and the ground.

My invention, in its broad and generic scope, consists of a device for hitching an agricultural implement, such as a plough, to a tractor, whereby not only can a close hitch be effected and a light weight plough used but a most favourable line of draft obtained without reducing the normal clearance space between the hitch point and the ground. The device comprises, in combination, means for pivotally connecting the implement to the tractor so that a downward force will be exerted on the implement under the draft or pull of the tractor sufficient to hold it properly down to its work in spite of the implement being close hitched and of light weight and means for preventing the implement turning upwards out of the ground about its point of connection with said first mentioned means while leaving it free to move up and down in conformity with the contour of the ground. In the case of a plough the downward force exerted by the first mentioned means assists the suck or penetration of the shares and retains them at a uniform depth in the ground under the available draft, and the second means positively prevents the plough turning upwards out of the ground under the rearward thrust on the shares but leaves it free to rise and fall automatically about the point of actual connection with the tractor so as to ensure uniform ploughing.

My invention further consists of a novel device as hereinbefore stated, so arranged that the implement may also have freedom of movement laterally as required to make it possible to work efficiently when turning.

It further consists of a device for closely hitching a plough to a tractor, wherein provision is made for adjusting the shares to suit the depth of ploughing desired.

It further consists in providing, in conjunction with my novel close hitch, manually operated means for lifting and locking the implement in position above the ground when not in operation.

It further consists of other novel features as hereinafter described with reference to the accompanying drawings and as claimed in the succeeding claims.

The invention will now be described with reference to the accompanying drawings, whereon I have shown, by way of illustration or example, one construction of the new connection, suitable for a tractor and plough.

Fig. 1 is a side elevation of the plough and its connection to the tractor.

Fig. 2 is a plan view corresponding to Fig. 1.

Fig. 2ª shows the plough, Fig. 1, lowered into the ground.

Fig. 3 is a detailed view of the link mechanism and controls.

Fig. 4 is a plan view corresponding to Fig. 3.

Referring to the drawings, $a$ is the tractor, $a^1$ is the draw bar, and $a^2$ is an abutment. $b$ is a swivelling member or head which is attached to the draw bar $a^1$, and the abutment $a^2$, by pins $b^1$ and $b^2$. The member $b$ is provided with a loose pin joint, or a ball joint, $b^3$, to which one end $c^1$ of a double link $c$ is connected. The other end $c^2$ of the link $c$ is attached by a cross shaft $d$ to the plough frame $f$, the shaft $d$ being turnable in the sleeve $c^3$ at the end of $c^2$ of the link $c$. The member $b$ is also provided with a pin $b^4$ to which one end $g^1$ of a link $g$ is pivotally connected. The end $g^2$ of the link $g$ passes through and is free to turn in a boss $g^3$ having pins $h$ carried revolubly in brackets $f^1$ projecting from the top of the plough frame.

Above the connection $b^4$ another pin $b^5$ is carried in a vertically slotted hole $b^6$ in the member $b$. This pin $b^5$ is connected with the ends $k^1$ of a rockable member $k$, having an internally screw threaded sleeve $k^2$ at its other end which engages a screw threaded spindle $l$ supported in arms $m^2$, $m^2$, from a sleeve $m$, which, in turn, is supported by a spindle $n$ secured to, and supported by, the plough frame. A hand lever $m^1$ is rigidly secured at one end of the sleeve $m$, and, by means of said lever, the sleeve $m$ can be turned on the spindle $n$ for the purpose of raising or lowering the plough. The screw threaded spindle $l$ is provided with an operating handle $l^1$, whereby it can be turned. By turning the handle $l^1$, and screw spindle $l$, the plough frame $f$ can be moved laterally relatively to the rockable member $k$, whose pin connection $b^5$ is free to rock or tilt in the slotted hole $b^6$, so that the member $k$ may keep its proper angular relationship to the plough frame $f$. The plough frame with the link $c$ can tilt or rock, slightly owing to the loose joint $b^3$. $k^4$ is a hole in the member $k$ through which the link $g$ can pass.

I provide a spring $p$, connected, at one end, to a link $q$, which is secured to arms $r$ projecting from the sleeve $m$, and, at its other end, is adjustably connected with the plough frame through the medium of a screw $s$. The function of this spring will be hereinafter explained.

In the example shown, (Fig. 3) provision is made for altering the effective length of the link $g$ for the purpose of altering the depth of cut of the plough when so desired. For this purpose the link $g$ is screw threaded at its one end $g^1$ and enters a screw threaded socket $g^4$ connected with the pin $b^4$. The other end of the link $g$ passes the boss $g^3$ and has collars $h^1$ at each side of said boss and is formed into a handle whereby it can be turned for the purpose of lengthening or shortening it by screwing it into, or out of, the socket $g^4$.

Fig. 1 shows the plough lifted above the ground, and Fig. 2ª shows the plough when lowered into the ground by moving the lever $m^1$ backward in the direction of the arrow, Fig. 1. When the lever $m^1$ is moved in this manner it turns the sleeve $m$ and arms $m^2$ thereby straightening out the linkage $m^2$, $k$, and forcing the plough frame backwards and downwards which it readily does owing to the weight of the plough. At the same time the action of the link $q$ extends the spring $p$ and puts it under tension the re-action of the spring being utilized subsequently to assist in lifting the plough when required, which operation would otherwise require a greater effort owing to the weight of the plough. The spring $p$ can be normally tensioned, as desired, by means of the screw $s$. The plough is held in the raised position by the usual spring catch $m_4$ and notched guard $m^5$.

As will be seen from Fig. 1 and also Fig. 2ª the links $g$ and $c$ are not parallel but diverge slightly from the points of attachment to the member $b$, also the lower link $c$, is longer than the upper link $g$.

As will be seen from Fig. 2ª the lines $g^o$, $c^o$, drawn through the links $g$, $c$, intersect at a point $x$ which is in advance of the axle of the back wheels of the tractor and below the level of the hitch point $b^3$. The arrangement and action of the links is such that the draft of the plough, instead of being along a line from $b^3$ to $y$, which is unfavourable, is effected as if it were along the line $x$—$y$ which being close to the ground is a most favourable line of draught.

The point or position from which the line of draft extends continually changes as relative up and down movement takes place between the implement and the tractor but the soil engaging part of the implement (in the case of a plough, the share) is constrained to follow a curve which, in the plough shown at Fig. 2ª approximates to the arc of a true circle whose centre is at the point $x$ so that what may be termed the effective line of draft is from a point or position other than the actual hitch point. In Fig. 2ª the dotted line 3—3 indicates the aforesaid curve. It may be explained the links $g$, $c$, are so disposed, in the example shown, that the bi-secting point of the lines $g^o$, $c^o$, will be at $x$.

In operation the connection acts as follows:

The forward pull of the tractor tends to pull the member $c$ downwards (about $b^3$) to the horizontal thereby effecting a downward thrust on the plough and holding it down to its work whilst the pull of the tractor also causes a rearward thrust by the ground on the plough shares with the result that the plough tends to swing backwards and angularly upwards the tendency being to turn about the centre $d$. This turning movement which tends to raise the shares out of the ground causes the link $g$ to thrust on the member $b$ and the abutment $a^2$ which thrust is countered and resisted by the mass of the tractor. In all normal circumstances, even with a light weight "Fordson" tractor, the combined action is sufficient to hold the plough down to its work so that the ploughing is effective and at a uniform depth. In some cases, as, when the plough strikes an obstruction, such as a boulder or the like, the re-action on the link connection is so great that actually the back of the tractor is raised slightly off the ground with the result that the back wheels skid or spin and in this manner relieve the stress, thereby preventing breakage of the connection.

It will be seen from the foregoing that the link $g$ acts as a pressure resisting or compression member whilst the link $c$ acts as a tension or draft member. The arrangement and disposition of these members, whilst permitting the plough freedom of up and down movement and to be easily raised and lowered by the hand lever $m^1$ yet positively prevents the plough turning upwards of itself out of the ground even although the shares are subjected to great stress. When the plough is raised up it remains in position on the rear of the tractor and forms part thereof being supported by the links $c$, $g$, and $k$, and held by the locked lever $m^1$.

By turning the link $g$ its effective length can be increased or decreased and thereby lift or lower the plough slightly.

When the plough is in operation in the ground the spring $p$ is under tension and exerts a downward pull on the arms $r$ and thereby tends to raise the plough. When ploughing at about the depth illustrated in Fig. 2$^a$ the tendency to lift the plough is very slight because owing to the position of the arms $r$ (see Fig. 3) the leverage is very small so that the spring is practically ineffective. However, as the operator turns the hand lever $m^1$ in the direction of the arrow to raise the plough, the arms $r$ to which the spring is connected by means of the link $q$ move downwards and the tensioned spring then acts with a gradually increasing leverage and becomes of practical assistance to the operator in lifting the plough.

When ploughing at greater depth the arms $r$ will be in such a position that the pull of the spring passes through the axis of the shaft $n$ and is then wholly ineffective so that it has no tendency whatever to raise the plough. Again, when ploughing at even greater depth the arms $r$ move upwards to the left of the shaft $n$ past the dead centre and the spring then actually has a tendency to keep the plough down in the ground. Of course, when, by moving the hand lever $m^1$, the arms $r$ are brought below the dead centre the spring acts as before stated with a gradually increasing leverage to assist the operator in raising the plough.

In Fig. 2$^a$ the lever $m^1$ is moved so as to be free of the quadrant and therefore allow the implement freedom for up and down movement.

The advantages of the new connection compared with a single hitch connection at $b^3$, of the ordinary type are as follows:—

The plough can be kept in the ground at the desired depth by the improved connection whilst giving a favourable line of draft.

Owing to the fact that the improved connection tends to raise the rear of the tractor, when the plough meets an obstruction, additional weight is thrown on to the front wheels, thereby countering any tendency of the tractor to turn over backwards and injure the operator and also utilizing the weight of the tractor to hold the plough down to its work.

Another important advantage derived from this form of connection is that no safety device is required to save implement breakage as, when the plough shares meet with an obstruction, as aforesaid, the tendency is to lift the rear of the tractor to such an extent as will allow the back wheels to skid or spin and relieve the stress.

When the plough is closely hitched and carried on the tractor, the tractor and implement can be turned in a short radius and it is also possible after the plough has been raised, which can be done from the driver's seat, to reverse the tractor when desired.

When ploughing on hillsides it is not possible for the implement to sag down the hillside, relatively to the tractor, to anything like the same extent as when a long hitch is used.

The connection allows both upward (or downward) and lateral freedom of movement between the implement and tractor.

Although the plough cannot turn angularly upwards round the point $d$ during operation yet it can be easily raised and lowered by the gear described.

In some cases, the links may be directly connected to the tractor, universal joints being used.

Having now fully described my invention what I claim and desire to secure by Letters Patent is:—

1. Means for attaching an implement to a tractor, comprising upper and lower members movably connected to the tractor and to the implement so as to permit free relative movement between the tractor and implement when in operation, said members being arranged so as to cause the effective line of draft to be from a position other than that of the actual connection between the tractor and the implement.

2. Means for attaching an implement to a tractor comprising upper and lower members movably connected to the tractor and to the implement, said members being arranged so as to cause the effective line of draft to be from a position other than that of the actual connection between the tractor and the implement, said members also allowing, while in operation, free relative up and down movement of the implement and tractor.

3. Means for attaching an implement to a tractor comprising upper and lower members movably connected to the tractor and to the implement so as to permit free relative movement between the tractor and implement when in operation, said members being arranged so as to cause the effective line of draft to be from a position other than that of the actual connection between the tractor and the implement, said means including means co-operating with said members to allow the implement to move laterally relatively to the tractor.

4. Means for attaching an implement to a tractor comprising upper and lower members movably connected to the tractor and to the implement, said members being arranged so as to cause the effective line of draft to be from a position other than that of the actual connection between the tractor and the implement, said members also allowing, while in operation, free relative up and down movement of the implement and tractor said means including means co-operating with said members to allow the implement to move laterally relatively to the tractor.

5. Means for attaching an implement to a tractor comprising an upper pressure resisting member and a lower member both movably connected to the tractor and to the implement, the connections of both members to the implement being in normal working conditions above their connections to the tractor, the said members being arranged so as to permit, when in operation, free relative up and down movement of the implement and the tractor.

6. Means for attaching an implement to a tractor comprising an upper pressure resisting member and a lower member both freely connected to the tractor and to the implement, the connections of both members to the implement being in normal working conditions above their connections to the tractor, the said members being so arranged and connected to the tractor as to allow the implement to move from side to side relatively to the tractor.

7. Means for attaching an implement to a tractor comprising an upper pressure resisting member and a lower member both movably connected to the tractor and to the implement, the connections of both members to the implement being in normal working conditions above their connections to the tractor, the said means being so arranged and connected as to allow the tractor and implement to move freely up and down and also from side to side relatively to the tractor.

8. Means for attaching an implement to a tractor comprising an upper pressure resisting member and a lower draft member both freely connected at different points to the tractor and to the implement to permit, during operation, up and down movement of the implement, the points of connection to the implement being above one another and being further apart than the points of connection to the tractor.

9. Means for attaching an implement to a tractor comprising an upper pressure resisting member and a lower draft member both freely connected at different points to the tractor and to the implement to permit, during operation, up and down movement of the implement, the points of connection to the implement being above one another and being further apart than the points of connection to the tractor, the upper pressure resisting member being shorter than the lower member.

10. Means for attaching an implement to a tractor comprising an upper pressure resisting member and a lower draft member both freely connected at different points to the tractor and to the implement to permit, during operation, up and down movement of the implement, the points of connection to the implement being above one another and being further apart than the points of connection to the tractor, the said members conjointly carrying the whole implement when the latter is attached to the tractor and is not in operation.

11. A connection for coupling an implement to a tractor comprising means which, when the implement is attached by the connection to and is pulled by the tractor, exerts a downward pull or pressure on the implement, and automatically holds it down to its work, and also means automatically preventing the implement, whilst in operation in the ground, from turning angularly upwards out of the ground on, or around, the first mentioned means.

12. A connection for coupling an implement to a tractor comprising means which, when the implement is attached by the connection to and is pulled by the tractor, exerts a downward pull or pressure on the implement and automatically holds it down to its work, and also means automatically preventing the implement, whilst in operation in the ground, from turning angularly upwards out of the ground on, or around, the first mentioned means, both means coacting to allow the tractor and implement free relative up and down movement.

13. A connection for coupling an implement to a tractor comprising means which when the implement is attached by the connection to and is pulled by the tractor, exerts a downward pull or pressure on the implement and automatically holds it down to its work, and also means automatically preventing the implement, whilst in operation in the ground, from turning angularly upward out of the ground on, or around, the first mentioned means, and means acting in conjunction with the said means to allow the implement to move laterally relative to the tractor.

14. A connection for coupling an implement to a tractor comprising means which when the implement is attached by the connection to and is pulled by the tractor, exerts a downward pull or pressure on the implement and automatically holds it down to its work, and also means automatically preventing the implement, whilst in operation in the ground, from turning angularly upwards out of the ground on, or around, the first mentioned means, and means acting in conjunction with the said means to allow the tractor and implement to move relatively freely up and down and from side to side.

15. A device for connecting an implement to a tractor, comprising upper and lower link members, said link members allowing the tractor and implement free relative up and down movement, spring means for automatically assisting the raising of the implement and for holding the implement down to its work and means for rendering the spring means effective or ineffective at will.

16. The combination with an agricultural implement, of an upper pressure resisting member freely connected to the implement, a lower draft member freely connected to the implement, a head to which the members are both freely connected, and means whereby the said head can be attached to a tractor, so that when the head is attached to the tractor the implement will have freedom of up and down movement, when in operation, relative to the head.

17. The combination with an agricultural implement, of an upper pressure resisting member freely connected to the implement, a lower draft member freely connected to the implement, a head to which the members are both freely connected, and means whereby the said head can be attached to a tractor, so that when the head is attached to the tractor the implement will have freedom of up and down movement, when in operation, relative to the head, the said pressure resisting member being adjustable in length.

18. Means for attaching an implement to a tractor comprising upper and lower members movably connected to the implement and adapted to be freely connected to a tractor, said members being arranged so as to cause the effective line of draft to be from a position other than that of the actual connection between the tractor and the implement, said members also allowing, while in operation, free relative up and down movement between the implement and tractor, and mechanism for controlling the various positions of the implement, the said mechanism being carried on the implement itself and being arranged in conjunction with said members to form a unitary structure.

19. Means for attaching an implement to a tractor comprising upper and lower members freely connected to the tractor and to the implement, said members being arranged so as to cause the effective line of draft to be from a position other than that of the actual connection between the tractor and the implement, said members also allowing, while in operation, free relative up and down movement of the implement and tractor, the weight of the tractor assisting said means in retaining the implement in its working position.

20. A device for hitching an agricultural implement, such as a plough, to a tractor comprising, in combination, a member on the tractor having freedom of movement horizontally, means pivotally connecting the implement to said member and adapted to exert a downward force on the implement under the draft of the tractor, and means for automatically preventing the implement turning angularly about its point of connection with said first mentioned means, while leaving it free to move upwards and downwards.

21. A device for closely hitching an agricultural implement, such as a plough, to a tractor comprising, in combination, means for pivotally connecting the implement to the tractor, and adapted to exert a downward force on the implement under the draft of the tractor, means for automatically preventing the implement turning about its point of connection with said first mentioned means, while leaving it free to move therewith in a vertical plane, and manually operable means for raising the implement above the ground when not in operation and locking it in position.

22. A device for hitching an agricultural implement, such as a plough, to a tractor, comprising, in combination, a member pivotally connected to the tractor and, at a higher level, to the implement whereby a downward force is exerted on the implement under the draft of the tractor, and means between the tractor and the implement to prevent the implement turning angularly about said member under the rearward thrust on the implement while leaving it free to move automatically about its connection with the tractor, said means being adjustable in length.

23. A device for closely hitching an agricultural implement, such as a plough, to a tractor, comprising, in combination, a member pivotally connected to the tractor and, at a higher level, to the implement whereby a downward force is exerted on the implement under the draft of the tractor, and means between the tractor and the implement to prevent the implement turning angularly upwards about said member under the rearward thrust on the implement while leaving it free to move laterally and also freely upwards and downwards about its connection to the tractor.

24. A coupling for use between a tractor and an implement, comprising an upper and a lower element adapted to be movably secured to the tractor and to said implement, the upper element being pressure resisting, the implement connection of the lower element being located in a higher plane than its tractor connection, said coupling permitting the implement to move freely up and down, and the parts thereof being so arranged that the effective line of draft is below said coupling.

In testimony whereof I affix my signature in presence of two witnesses.

HARRY FERGUSON.

Witnesses:
AUDREY HAMILTON,
ETHEL BURROWS.